United States Patent [19]

Wise

[11] 3,962,518

[45] June 8, 1976

[54] COMPOSITE OF POLYESTER BONDED TO RUBBER, METHOD FOR MAKING THE SAME AND COMPOSITION

[75] Inventor: Richard M. Wise, Uniontown, Ohio

[73] Assignee: The General Tire & Rubber Company, Akron, Ohio

[22] Filed: Dec. 20, 1974

[21] Appl. No.: 534,951

Related U.S. Application Data

[62] Division of Ser. No. 310,525, Nov. 29, 1972, Pat. No. 3,861,980.

[52] U.S. Cl. ............................ 428/395; 428/292; 428/375; 428/378
[51] Int. Cl.² ................ B32B 27/34; D02G 3/00
[58] Field of Search .......... 428/375, 395, 378, 292, 428/295

[56] References Cited

UNITED STATES PATENTS

| | | |
|---|---|---|
| 2,817,616 | 12/1957 | Wolfe ............................ 428/395 X |
| 3,578,613 | 5/1971 | Tai ................................ 428/395 X |
| 3,660,202 | 5/1972 | Edington et al. .................... 156/335 |
| 3,857,730 | 12/1974 | Kalafus et al. ...................... 428/395 |

*Primary Examiner*—Lorraine T. Kendell

[57] ABSTRACT

Rubber compounds are readily bonded to polyester reinforcing elements, particularly tire cords of polyester fibers, using a one-step dip process in which the dip consists essentially of an alkaline aqueous dispersion of a minor amount by weight of a mixture of a major amount by weight of a rubbery vinyl pyridine copolymer and a minor amount by weight of a heat reactable 2,6-bis(2,4-dihydroxy phenylmethyl)-4-chlorophenol composition. High H-adhesions are obtained with this process.

10 Claims, No Drawings

COMPOSITE OF POLYESTER BONDED TO RUBBER, METHOD FOR MAKING THE SAME AND COMPOSITION

This application is a division of U.S. Ser. No. 310,525 filed Nov. 29, 1972, now U.S. Pat. No. 3,861,980, granted Jan. 21, 1975.

OBJECTS

An object of this invention is to provide composite articles containing polyester reinforcing elements, e.g., such as those used in the carcass plies of tires, having a minor amount of a one-dip adhesive so that the adhesive containing elements may subsequently be bonded to rubber on curing and being characterized by exhibiting high cord H-adhesions. A further object is to provide a method for bonding polyester fibers, cords and so forth to rubber compounds using a single-step dipping process and the product of said method. A still further object is to provide a composition useful as a polyester tire cord adhesive dip. These and other objects and advantages of the present invention will become more apparent to those skilled in the art from the following detailed description and working examples.

SUMMARY OF THE INVENTION

According to the present invention it has been discovered that polyester reinforcing elements can readily be bonded or adhered to curable rubbery compounds by dipping the elements in a dip consisting essentially of an aqueous alkaline dispersion of a minor amount by weight of a mixture of a major amount by weight of a rubbery vinyl pyridine copolymer and a minor amount by weight of a heat reactable 2,6-bis(2,4-dihydroxy phenylmethyl)-4-chlorophenol composition, drying the same, and combining said dipped and dried element with a vulcanizable rubber compound and vulcanizing the same.

Polyester reinforcing elements treated in this fashion exhibit high H-adhesion values. Also, aged polyester reinforcing elements retain a major amount of their original H-adhesion values.

DISCUSSION OF DETAILS AND PREFERRED EMBODIMENTS

The polyester reinforcing elements of the present invention comprise fibers, continuous filaments, staple, tow, yarns, cords, fabric and the like, particularly cords for use in building the carcasses of tires such as truck tires, and are linear high molecular polyesters usually made by the condensation of $\alpha,w$-glycols and dicarboxylic acids. These polyester fibers and the like may be oriented and can have number average molecular weights up to about 60,000 and melting points of up to about 300°C. Preferably, these polyesters exhibit substantial crystallinity, up to as much as about 50%, usually 38–45%, high strength and high tenacity. Also, preferred, are the polyesters in which the fiber is composed of at least 80% by weight of an ester of a dihydric alcohol and terephthalic acid such as poly(ethylene terephthalate). Examples of such polyesters are the high molecular weight polymers obtained from polyethylene glycols and the aromatic dicarboxylic acids, e.g., the high molecular weight condensation product obtained from ethylene glycol and terephthalic acid known as polyethylene terephthalate. Other polyesters which may be used are poly(ethylene oxybenzoate); polypivalalactone; terpolymers from dimethyl phthalate, dimethyl isophthalate and ethylene glycol; polyesters having at least two different repeating units from ethylene terephthalate, p-trimethylene oxybenzoate, and ethylene-1,4-diphenoxy butane-4,4'-dicarboxylate; poly(ethylene terephthalate-isophthalate); poly(1,4-cyclohexylenedimethylene terephthalate); and the like and mixtures thereof. Suitable polyester reinforcing elements are commercially available under the trademarks "Dacron" (du Pont), "Encron" (American Enka Corporation) and "Vycron" (Beaunit Corporation). These high molecular weight linear polyesters are well known and can be made by methods known to the art. For example, the preparation of polyesters is shown by U.S. Pat. Nos. 2,465,319; 2,965,613 and 2,901,466. A detailed discussion of polyesters such as polyester cords and fabrics used in the manufacture of tires and other adhesive dips for the same is shown by "Mechanics of Pneumatic Tires", Clark, National Bureau of Standards Monograph 122, U.S. Department of Commerce, issued November, 1971, pages 238 to 241 and 279 to 290. Other references disclosing the preparation of polyesters useful for making filaments, fibers, cords and so forth and which can be used to make various products are:

A. "Encyclopedia of Polymer Science And Technology", Volume 11, 1969, Interscience Publishers a division of John Wiley & Sons, Inc., New York, pages 1–41;

B. "Encyclopedia of Chemical Technology", Kirk-Othmer, Second Edition, Volume 16, 1968, Interscience Publishers a division of John Wiley & Sons, Inc., New York, pages 143 to 159; and C. "Polyesters", Korshak et al, 1965, Pergamon Press Inc., New York, N.Y., pages 384 to 415.

The type of rubber latex used in the tire cord dip bath of this invention is a latex of a copolymer of a vinyl pyridine and a conjugated diolefin having 4 to 6 carbon atoms. The rubber latex is of the type described in U.S. Pat. No. 2,561,215 and comprises an aqueous dispersion of a copolymer of 50 to 95 percent by weight of a conjugated diolefin having 4 to 6 carbon atoms, 5 to 40 percent of a vinyl pyridine and 0 to 40 percent of a styrene. Examples of suitable vinyl pyridines are 2-vinyl pyridine, 4-vinyl pyridine, 2-methyl-5-vinyl pyridine, and 5-ethyl2-vinyl pyridine.

In practicing this invention, it is usually preferred to use a latex of a copolymer of from about 60 to 80% by weight of butadiene-1,3, 7 to 22% by weight styrene and 7 to 22% by weight of 2-vinyl pyridine. Excellent results are obtained using a latex of a terpolymer of about 70% of butadiene-1,3, 15% of styrene and 15% of 2-vinyl pyridine, by weight, having a total solids content of around 30 to 50 percent. Further disclosures of rubbery vinyl pyridine copolymer latices may be found in U.S. Pat. Nos. 2,615,826 and 3,437,122.

The heat reactable 2,6-bis(2,4-dihydroxy phenyl methyl)-4-chlorophenol composition used in the dip of the present invention is made by the process of first reacting about 2 mols of formaldehyde with 1 mol of parachlorophenol to provide 2,6-dimethylol-4-chlorophenol which then is reacted with about 2 mols of resorcinol to give the heat reactable bis(dihydroxy phenylmethyl)chlorophenol composition. The final product may be treated to remove unused starting materials and by-products although this is not usually necessary. However, the product as produced is substantially heat reactable 2,6-bis(2,4-dihydroxy phenylmethyl) -4-chlorophenol composition having an average molecular weight of up to about 800 and a melting point of up to about 240°C. It is preferably used as made without subsequent expensive purification steps. It is added to or mixed with the latex of the rubbery vinyl pyridine copolymer in the form of a solution 5–30% solids in water containing $NH_3$ sufficient to render the solution alkaline, usually about 0.5 to 7.5%. More information on how to prepare the heat reactable 2,6 -bis(2,4-dihydroxy phenyl methyl)-4-chlorophenol composition is shown by Mather, "Development of a Polyester-Rubber Adhesive", British Polymer Journal, Volume 3, March, 1971, pages 58 to 62 and U.S. Pat. No. 3,660,202. The chlorophenolic composition is heat reactable so that it can react with itself, the rubber and possibly also the cord.

Water is used in an amount sufficient to provide for the desired dispersion of the rubber or latex particles, for the solution of the heat reactable chlorophenolic composition and for the proper solids content to get the necessary pick-up of solids on and penetration between the fibers of the polyester cord.

The dip thus consists essentially of an aqueous dispersion of the rubbery vinyl pyridine copolymer latex and the heat reactable chlorophenolic composition, the copolymer and chlorophenolic composition being present in a total amount (as dry solids, dispersed or dissolved in the water) of from about 10 to 30% by weight. The ratio (dry) of the copolymer to the chlorophenolic composition in the dip is from about 100:10 to 100:75 parts by weight, preferably from about 100:35 to 100:55 parts by weight. Sufficient alkaline material is present from the chlorophenolic solution to render the dip alkaline or additional alkaline material such as $NH_4OH$ can be added to achieve this purpose, to prevent premature coagulation of the rubbery copolymer and to solubilize the chlorophenolic compound.

In order to provide data for the tire cord adhesive of this invention, a standard single-cord H-pull test is employed to determine the static adhesion at room temperature and above of the adhesive-coated tire cord to rubber. All the data submitted herein including the examples which follow are based upon identical test conditions, and all test specimens are prepared and tested in the same way generally in accordance with ASTM Designation: D 2138-67.

In order to apply the adhesive dip to the polyester cords in a reliable manner, the cords are fed through the adhesive dip bath containing the rubber and the chlorophenol and into a drying oven where they are dried. Also, as the cords leave the oven they enter a cooling zone where they are air cooled. In each case the adhesive-coated cords leaving the dip are dried in the oven at from about 300+ to 500°F., or at a temperature below the temperature at which the polyester of the cord would lose its tensile strength, for from about 30–150 seconds. The time the cord remains in the dip is about a second or so or at least for a period of time sufficient to allow wetting of the cord and penetration of the fibers of the cord by the adhesive mixture.

The single-cord H-pull test is then employed to determine the static adhesion of the dried adhesive coated polyester fiber cords to rubber. In each case the rubber test specimens are made from the same standard type rubber composition using the following recipe:

| Material | Parts by Weight |
| --- | --- |
| Natural rubber (No. 3 Smoked Sheet) | 36.50 |
| Butadiene-styrene rubbery copolymer, average 23.5% bound styrene, emulsion polymerized | 43.50 |
| Polybutadiene (solution polymerized BD, about 93% cis-1,4, Raw Mooney ML-4 at 212°F. about 40–50) | 20.0 |
| Carbon black, high abrasion furnace (high structure) | 35.0 |
| Carbon black, fast extrusion furnace | 35.0 |
| Alkyl aromatic polyindene resin, reinforcing and processing aid, Picco 100, Pennsylvania Industrial Chemical Corp. | 4.5 |
| Naphthenic oil, Circosol Type 2XH, Sun Oil Co. | 32.80 |
| Zinc oxide | 3.8 |
| Stearic acid | 1.5 |
| Mixture of mono, di and tristyrenated phenols, Age Rite Spar, R. T. Vanderbilt Co., Inc., antioxidant | 1.2 |
| Benzothiazyl disulfide, Altax R. T. Vanderbilt Co., Inc., accelerator | 1.2 |
| Tetramethyl thiuram monosulfide, active ingredient, Thionex, accelerator, E. I. du Pont de Nemours & Co., Inc. | 0.1 |
| Crystex, about 80% insoluble sulfur and 20% petroleum oil, Stauffer Chemical Co. | 3.0 |

In every case the polyester cords to be tested are placed in parallel positions in a multiple-strand mold of the type described in the single-cord H-pull adhesion test designated ASTM D 2138-67, the mold is filled with unvulcanized rubber of the above composition, the cords being maintained under a tension of 50 grams each, and the rubber is cured 20 minutes at around 305°F. to the elastic state. Each rubber test specimen is ¼ inch thick and has a ⅜ inch cord embedment.

After the rubber has been cured, the hot reticulate cured rubber piece is removed from the mold, cooled, and H-test specimens are cut from said piece, each specimen consisting of a single polyester cord encased in rubber and having each end embedded in the center of a rubber tab or embedment having a length of around 1 inch or so. The specimens are then aged at least 16 hours at room temperature. The force required to separate the cord from the rubber is then determined at room temperature or 250°F. using an INSTRON tester provided with specimen grips. The maximum force in pounds required to separate the cord from the rubber is the H-adhesion value.

While the adhesive containing polyester reinforcing elements of this invention can be adhered to a vulcanizable blend of natural rubber, polybutadiene rubber, and rubbery butadiene-styrene copolymer by curing the same in combination together, it is apparent that said adhesive containing polyester reinforcing element can be adhered to other vulcanizable rubbery materials, by curing or vulcanizing the same in combination with the rubber, such as one or more of the foregoing rubbers as well as nitrile rubbers, chloroprene rubbers, polyisoprenes, vinyl pyridine rubbers, acrylic rubbers, isoprene-acrylonitrile rubbers and the like and mixtures of the same. These rubbers prior to curing can be mixed with the usual compounding ingredients including sulfur, stearic acid, zinc oxide, magnesium oxide, accelerators, antioxidants, antiozonants and other curatives and the like well known to those skilled in the art for the particular rubbers being employed.

Polyester fibers, yarns, filaments, cords or fabric and the like coated with the adhesive of the present invention can have from about 3 to 7% by weight (dry) total solids from the adhesive dip on the cord based on the weight of the cord and can be used in the manufacture of radial, bias, or belted-bias passenger tires, truck tires, motorcycle and bicycle tires, off-the-road tires, airplane tires, transmission belts, V-belts, conveyor belts, hose, gaskets, rubbers, tarpaulins and the like.

The following examples will serve to illustrate the invention with more particularity to those skilled in the art. In these examples the parts are parts by weight unless otherwise indicated.

EXAMPLE I

Polyester cords (type 1300/3) were dipped in the aqueous dispersion shown below and then were dried (heat treated) at 440°F. for 90 seconds with 0% applied stretch. After cooling, the cords were embedded in the standard type rubber stock discussed supra and molded, and the resulting assembly was cured for 20 minutes at 305°F. After curing, the assembly was removed from the mold and cooled, and the cords were tested according to the H-adhesion test described supra. The compositions of the cord dips and the test results are shown below:

TABLE I

| Polyester | Dip | Unaged | H-Adhesion Pounds (⅜ inch rubber embedment) At Room Temperature (about 25°C.) Steam Aged (3) | Heat Aged (4) |
|---|---|---|---|---|
| Dacron (1) | A | 56 | 43 | 43 |
| Dacron (1) | B | 46 | 29 | 27 |
| Dacron (1) | C | 48 | 30 | 34 |
| Fortrel (2) | D | 50 | — | 34 |

Notes:
Dip A — Aqueous dispersion of:
a. 67.5 parts of a latex of a rubbery terpolymer of 70% by weight butadiene-1,3, 15% by weight of styrene, and 15% by weight of 2-vinyl pyridine (41% by weight solids);
b. 67.5 parts of water; and
c. 65.0 parts of an aqueous solution containing about 5.5% by weight of $NH_3$ and 20% by weight of 2,6-bis(2,4-dihydroxy phenylmethyl)-4-chlorophenol (e.g., the reaction product of $H_2CO$, resorcinol and p-chlorophenol).

Dip B — a. 4.5 parts of resorcinol were reacted with 4.0 parts of formaldehyde solution (37% by weight of $H_2CO$ in $H_2O$) in 81.3 parts of $H_2O$ plus 8.8 parts of 1 N NaOH;
b. After B. a. was aged 2 hours, there were mixed with B. a. 66.2 parts of the same type of rubber latex as shown for Dip A, above; and
c. After the B. b. mixture was aged for 24 hours, there was mixed with said B. b. 32.9 parts of the same type of aqueous alkaline chlorophenolic solution as shown for Dip A, above.

Dip C — Aqueous dispersion of:
a. 84.9 parts of the same type of rubber latex as shown for Dip A, above;
b. 95.1 parts of a mixture of 87.1 parts of water and 8.0 parts of diglycidyl glycerol (Epon 812, Shell Chemical Company, condensation product of epichlorohydrin and glycerine having an epoxide functionality of about 2.2 and an epoxide equivalent of 140 to 160); and
c. 20 parts of a mixture of 18 parts of water and 2 parts of tetraethylenepentamine.

Dip D — a. Same as Dip B. a.
b. Same as Dip B. b.
c. After D. b. mixture was aged for 24 hours there was mixed with said D. b. a mixture of 26.3 parts of water and 6.6 parts of the condensation product of resorcinol, cresol and formaldehyde.

TABLE I-continued

| Polyester | Dip | Unaged | H-Adhesion Pounds (⅜ inch rubber embedment) At Room Temperature (about 25°C.) Steam Aged (3) | Heat Aged (4) |
|---|---|---|---|---|

(1) du Pont
(2) Celanese Corporation of America
(3) Sample was heated in closed container with water present at 250°F. for four hours under nitrogen before conducting H-adhesion test.
(4) Sample was heated in closed container at 300°F. for 24 hours under nitrogen before conducting H-adhesion test.

The above tests show the remarkably high H-adhesion observed for polyester cord both aged and unaged when using the aqueous alkaline dip of the present invention consisting essentially of the rubbery vinyl pyridine copolymer and the chlorophenolic compound.

EXAMPLE II

Dacron polyester cords (type 1300/3) were dipped in the single dip aqueous dispersions shown below and were heat treated at 440°F. for 90 seconds with 0% applied stretch. After cooling, the cords were embedded in the standard rubber stock discussed supra and molded, and the resulting assembly was cured for 20 minutes at 305°F. After curing, the assembly was removed from the mold and cooled, and the cords were tested according to the H-adhesion test method discussed supra. The compositions of the cord dips and the test results are shown below:

TABLE II

| Dip | Solids Ratio, Latex/Resin | Unaged | H-Adhesion Pounds (⅜ inch rubber embedment) At Room Temperature (about 25°C.) Steam Aged (5) | Heat Aged (5) |
|---|---|---|---|---|
| A | 100/46.9 | 56 | 46 | 44 |
| E | 100/35 | 58 | 45 | 44 |
| F | 100/25 | 49 | 45 | 42 |
| G | 100/15 | 48 | 39 | 38 |
| B(control) | | 46 | 29 | 27 |

Notes:
Dip A — Same as Dip A in Example I, above.
Dip B — Same as Dip B in Example I, above.
Dip E — a. 72.3 parts of a latex of a rubbery terpolymer of 70% by weight butadiene-1,3, 15% by weight of styrene, and 15% by weight of 2-vinyl pyridine (41% by weight solids);
b. 75.8 parts of water; and
c. 51.9 parts of an aqueous solution containing about 5.5% by weight of $NH_3$ and 20% by weight of a mixture comprising substantially 2,6-bis(2,4-dihydroxy phenylmethyl)-4-chlorophenol (e.g., the reaction product of HCHO, p-chlorophenol, and resorcinol).

Dip F — a. 78.0 parts of a latex of a rubbery terpolymer of 70% by weight butadiene-1,3, 15% by weight of styrene, and 15% by weight of 2-vinyl pyridine (41% by weight solids);
b. 82.0 parts of water; and
c. 40.0 parts of an aqueous solution containing about 5.5% by weight of $NH_3$ and 20% by weight of a mixture comprising substantially 2,6-bis(2,4-dihydroxy phenylmethyl)-4-chlorophenol (e.g., the reaction product of HCHO, p-chlorophenol, and resorcinol).

Dip G — a. 84.2 parts of a latex of a rubbery terpolymer of 70% by weight butadiene-1,3, 15% by weight of styrene, and 15% by weight of 2-vinyl pyridine (41% by weight solids);
b. 89.9 parts of water; and
c. 25.9 parts of an aqueous solution containing about 5.5% by weight of $NH_3$ and 20% by weight of a mixture comprising substantially 2,6-bis(2,4-dihydroxy

TABLE II-continued

| Dip | Solids Ratio, Latex/Resin | H-Adhesion Pounds (⅜ inch rubber embedment) At Room Temperature (about 25°C.) | | |
|---|---|---|---|---|
| | | Unaged | Steam Aged (5) | Heat Aged (5) | phenylmethyl)-4-chlorophenol (e.g., the reaction product of HCHO, p-chlorophenol, and resorcinol).

The test results in Table II show the much higher adhesions obtained using the type of dip of the present invention. Even at the rubber copolymer/chlorophenolic compound ratio of 100:15 the in-rubber aged adhesions are much higher than the Dip B control.

5. Same methods as shown in Example I, above.

What is claimed is:

1. A bonded composite material comprising a polyester element embedded in a vulcanized rubber, said element containing a total of from about 3 to 7% by weight (dry) based on the weight of said element of an adhesive composition consisting essentially of a deposit of a heat set mixture of a major amount by weight of a rubbery vinyl pyridine copolymer and a minor amount by weight of a heat reactable 2,6-bis(2,4-dihydroxy phenylmethyl)-4-chlorophenol composition, said adhesive composition forming a bond between said element and said rubber, and said chlorophenol composition having been made by the process of first reacting about 2 mols of formaldehyde with 1 mol of parachlorophenol to provide 2,6-dimethylol-4-chlorophenol which then is reacted with about 2 mols of resorcinol.

2. A bonded composite material according to claim 1, where said rubbery vinyl pyridine copolymer is a copolymer of from about 60 to 80% by weight of butadiene-1,3, from 7 to 22% by weight of styrene, and from 7 to 22% by weight of 2-vinyl pyridine, where the parts by weight ratio of said rubbery vinyl pyridine copolymer to said chlorophenolic composition is from about 100:10 to 100:75, and where said chlorophenolic composition has an average molecular weight of up to about 800 and a melting point of up to about 240°C.

3. A bonded composite material according to claim 2, where said element is a cord of linear long chain synthetic substantially crystalline poly(ethylene terephthalate).

4. A bonded composite material according to claim 1, where said rubbery vinyl pyridine copolymer is a copolymer of about 70% by weight of butadiene-1,3, 15% by weight of styrene, and 15% by weight of 2-vinyl pyridine and where the parts by weight ratio of said rubbery vinyl pyridine-copolymer to said chlorophenolic composition is from 100:35 to 100:55.

5. A bonded composite material according to claim 4, where said element is a cord of linear long chain synthetic substantially crystalline poly(ethylene terephthalate).

6. A polyester element useful in reinforcing rubber, said element containing a total of from about 3 to 7% by weight (dry) based on the weight of said element of an adhesive composition consisting essentially of a deposit of a heat set mixture of a major amount by weight of a rubbery vinyl pyridine copolymer and a minor amount by weight of a heat reactable 2,6-bis(2,4-dihydroxy phenylmethyl)-4-chlorophenol composition, said chlorophenol composition have been made by the process of first reacting about 2 mols of formaldehyde with 1 mol of parachlorophenol to provide 2,6-dimethylol-4-chlorophenol which then is reacted with about 2 mols of resorcinol.

7. A polyester element according to claim 6, where said rubbery vinyl pyridine copolymer is a copolymer of from about 60 to 80% by weight of butadiene-1,3, from 7 to 22% by weight of styrene, and from 7 to 22% by weight of 2-vinyl pyridine, where the parts by weight ratio of said rubbery vinyl pyridine copolymer to said chlorophenolic composition is from about 100:10 to 100:75, and where said chlorophenolic composition has an average molecular weight of up to about 800 and a melting point of up to about 240°C.

8. A polyester element according to claim 7, where said element is a cord of a linear long chain synthetic substantially crystalline poly(ethylene terephthalate).

9. A polyester element according to claim 6, where said rubbery vinyl pyridine copolymer is a copolymer of about 70% by weight of butadiene-1,3, 15% by weight of styrene, and 15% by weight of 2-vinyl pyridine and where the parts by weight ratio of said rubbery vinyl pyridine-copolymer to said chlorophenolic composition is from about 100:35 to 100:55.

10. A polyester element according to claim 9, where said element is a cord of a linear long chain synthetic substantially crystalline poly(ethylene terephthalate).

* * * * *